(12) United States Patent
Poullaouec et al.

(10) Patent No.: US 8,369,423 B2
(45) Date of Patent: Feb. 5, 2013

(54) METHOD AND DEVICE FOR CODING

(75) Inventors: Ronan Poullaouec, Saint Aubin du Cormier (FR); Frederic Pasquier, Betton (FR); Xavier Ducloux, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 9 days.

(21) Appl. No.: 12/796,803

(22) Filed: Jun. 9, 2010

(65) Prior Publication Data

US 2011/0188578 A1    Aug. 4, 2011

(51) Int. Cl.
 *H04N 7/50*    (2006.01)
(52) U.S. Cl. ............... 375/240.29; 375/240.24
(58) Field of Classification Search ............. 375/240.24, 375/240.29
See application file for complete search history.

(56) References Cited

PUBLICATIONS

Tobajas F. "An Efficient Double Filter Hardware Architecture for H.264/AVC Deblocking Filtering" IEEE. vol. 54, No. 1, Feb. 1, 2008, pp. 131-139.*
"Advanced Video Coding for Generic Audivisual Services" ITU-T Telecommunication Standardization Sector of ITU, Mar. 2009, pp. 202-214.*
Tobajas, F. et al. "An Efficient Double-Filter Hardware Architecture for H.264/AVC Deblocking Filtering", 2008, IEEE Transactions on Consumer Electronics, IEEE Service Center, New York, vol. 54, No. 1 pp. 131-139.
Wang, Y. et al. "Adaptive Video Coding in Loop Filter Based on Content", 2003, IEEE Conf. Neural Networks & Signal Processing, Proceedings of the 2003 International Conference on Nanjing, China, Psicataway, NJ, vol. 2, Dec. 14, 2003. pp. 1189-1192.
"Advanced Video Coding for Generic Audiovisual Services, Pages" ITU-T Telecommunictio Sandardization Sector of ITU, No. H.264. Mar. 2009, pp. 202-214, 425, Geneva.
French Search Report dated Jan. 13, 2010 for FA 722854 and FR0953801.

* cited by examiner

*Primary Examiner* — Sath V Perungavoor
*Assistant Examiner* — Jeffery Williams
(74) *Attorney, Agent, or Firm* — Tutunjian & Bitetto, P.C.

(57) ABSTRACT

The invention relates to a method for coding a sequence of images, comprising the following steps:
 determining, for the image data, the prediction image data from reference image data,
 calculating residual data from image data and prediction image data,
 quantizing the residual data with a quantization step,
 reconstructing the image data into reconstructed image data,
 filtering the reconstructed image data according to at least one filtering parameter with a view to their use as reference image data,
 coding the quantized residual data,
 selecting a function representing the variations of at least one filtering parameter according to a quantization step value of a set of at least two functions from a predetermined value representative of a filtering intensity,
 determining the value of at least one filtering parameter from the function selected and the quantization step.

7 Claims, 4 Drawing Sheets

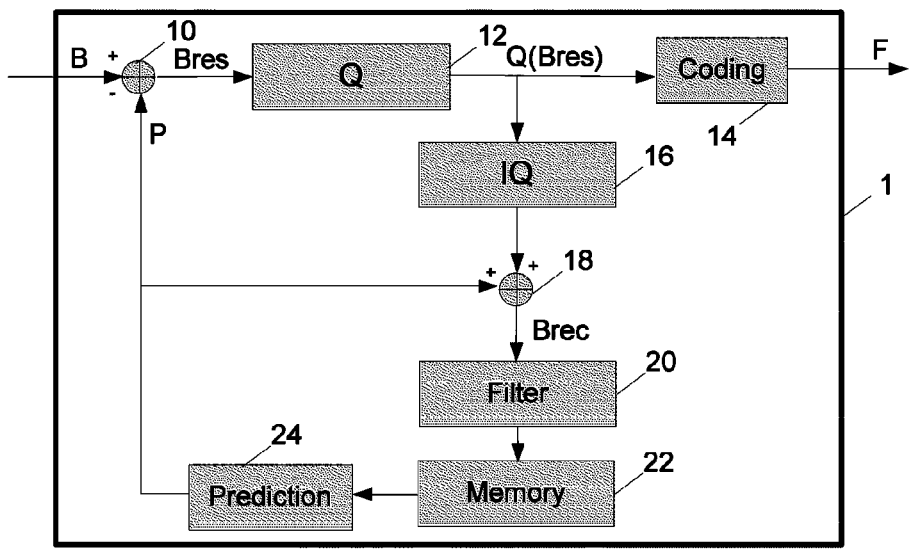
FIGURE 1 – PRIOR ART
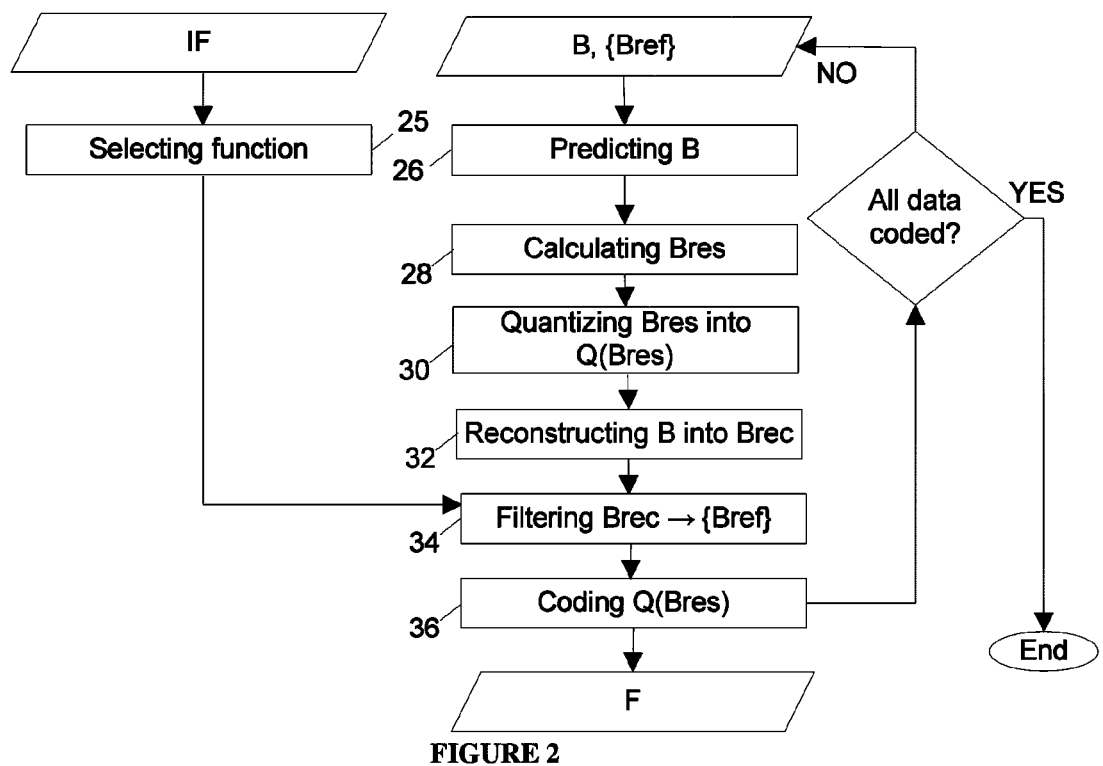
FIGURE 2

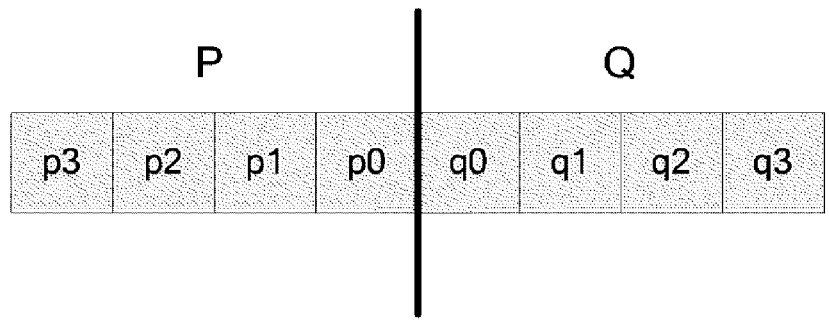
FIGURE 3
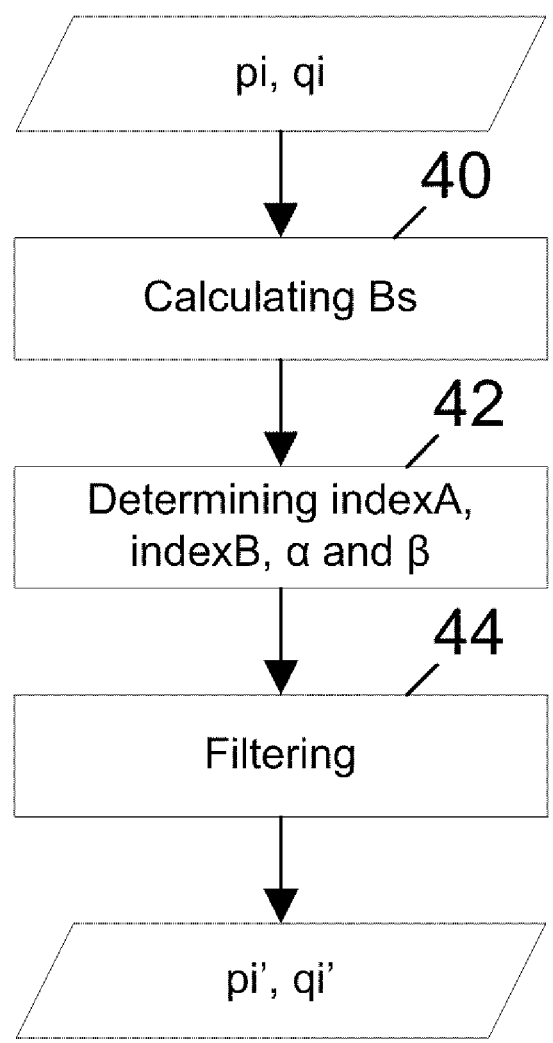
FIGURE 4 – PRIOR ART

METHOD AND DEVICE FOR CODING

This application claims the benefit, under 35 U.S.C. §119 of French Patent Application 0953801, filed Jun. 9, 2009.

1. SCOPE OF THE INVENTION

The invention relates to the domain of image coding.

The invention relates more particularly to a method for coding images of the type comprising a step of filtering. It also relates to a coding device implementing the coding method.

2. PRIOR ART

In reference to FIG. 1, a coding device 1 is known in the art that compresses and codes images of a sequence of images in the form of a coded data stream F with a view for example to their transfer onto a network. Such a coding device 1 operates generally on blocks of pixels B of an image of the sequence. At least one item of image data is associated with each pixel. The coding device 1 notably implements a coding with temporal (mode INTER) and possibly spatial (mode INTRA) prediction. The coding device 1 notably comprises a calculation module 10 subtracting pixel by pixel from a current block B, a prediction block P to generate a block of residual image data or residual block noted as Bres. It comprises in addition a module 12 quantizing the residual block Bres into a block of quantized data Q(Bres). According to a variant the module 12 applies, before quantizing them, a transform on the residual image data Bres like for example a Discrete Cosine Transform. The coding module 1 further comprises an entropy coding module 14 coding the quantized data into a stream F of coded data. It also comprises a module 16 carrying out the inverse operation of module 12. The module 16 carries out an inverse quantization IQ followed by an inverse transform IT. The module 16 is connected to a calculation module 18 that adds pixel by pixel the block of data from the module 16 and the prediction block P to generate a block of reconstructed image data Brec. It further comprises a filtering module 20 that filters the reconstructed image data before their storage in a memory 22. Generally, the filtering module 20 filters the reconstructed image data more or less heavily in accordance with one or more filtering parameters that are coded in the coded data stream F. The filtering parameters are transmitted once for the entire sequence, with each image of the sequence or again with portions of images. As an example, the filtering parameters slice_alpha_c0_offset_div2 and slice_beta_offset_div2 of the standard H.264/MPEG4 AVC are coded in the stream F in the image slice headers.

The prediction block P is determined from reference image data Bref stored in the memory 22. The reference image data belong either to the same image as the block B (mode INTRA) or to the other images (mode INTER).

The prediction module 24 is not described. However, it is well known to those skilled in the art of video coders that such a prediction module 24 comprises motion compensation and motion estimation units (mode INTER) as well as possibly a spatial prediction unit (mode INTRA). The coding device 1 comprises other modules such as a decision module that selects a coding mode for the block B in a coding mode predefined set.

When the filtering parameter values that influence the force with which the filtering module 20 filters reconstructed image data are constant for the sequence, the impression of filtering image on image may vary and is not necessarily adapted to the characteristics of the sequence or to the rendering requirements of the decodes stream (e.g. with textured high definition images, the "image definition" is important).

3. SUMMARY OF THE INVENTION

The purpose of the invention is to overcome at least one of the disadvantages of the prior art. For this purpose, the invention relates to a method for coding an image sequence comprising the following steps:

determining, for image data, the prediction image data from reference image data, calculating residual data from image data and prediction image data, quantizing residual data with a quantization step, reconstructing image data into reconstructed image data, filtering reconstructed image data according to at least one filtering parameter with a view to their use as reference image data, coding quantized residual data, selecting a function representing the variations of at least one filtering parameter according to a quantization step value of a set of at least two functions using a value representative of a filtering intensity, determining the value of at least one filtering parameter from the function selected and the quantization step.

Advantageously, the coding method according to the invention enables the filtering intensity to be adapted to the characteristics of the sequence or to the yield requirements of the decoded stream.

According to a particular characteristic of the invention, the coded data stream is in accordance with the H.264 video coding standard, there are two filtering parameters and they are slice_alpha_c0_div2 and slice_beta_offset_div2.

According to a particular embodiment, the set of functions comprises a first function f1, a second function f2 and a third function f3 defined as follows:

$f1(QP)=-2$ if $QP<T1$ and $f1(QP)=2/(T2-T1)*(QP-T2)$ if $T1<QP<T2$ and $f1(QP)=0$ if $QP>T2$;

$f2(QP)=-3$ if $QP<T1$ and $f2(QP)=1/(T2-T1)*(QP+2*T1-3*T2)$ if $T1<QP<T2$ and $f2(QP)=-2$ if $QP>T2$;

$f3(QP)=-6$ if $QP<T1$ and $f3(QP)=3/(T2-T1)*(QP+T1-2*T2)$ if $T1<QP<T2$ and $f3(QP)=-3$ if $QP>T2$;

where QP the quantization step.

According to a particular aspect of the invention, $T1=12$ and $T2=36$.

According to a particular characteristic, if the filtering intensity is low then the first function is selected, if the filtering intensity is medium than the second function is selected and if the filtering intensity is high then the third function is selected.

According to a particular embodiment, the function representing the variations of the at least one filtering parameter according to a quantization step value is selected, for INTRA type images, in a first set of first functions and for INTER type images, in a second set of second functions, the second functions being the first functions translated from a positive value.

According to a particular characteristic, the positive value depends on a motion quantity determined in the image sequence.

The invention also relates to a device for coding of a sequence of images, each image being divided into blocks of pixels each of which is associated with at least one item of image data comprising:

means for determining, for image data, the prediction image data from reference image data, means for calculating residual data from image data and prediction image data, means for quantizing residual data with a quantization step, means for reconstructing image data into reconstructed image data, means for filtering reconstructed image data according to at least one filtering parameter with a view to their use as reference image data, means for coding the quantized residual data.

means for introducing a value representative of the filtering intensity, means for selecting a function representing the variations of at least one filtering parameter according to a quantization step value of a set of at least two functions using a value representative of a filtering intensity, means for determining the value of at least one filtering parameter from the function selected and the quantization step.

4. LIST OF FIGURES

The invention will be better understood and illustrated by means of embodiments and advantageous implementations, by no means limiting, with reference to the figures in the appendix, wherein:

FIG. 1 illustrates a coding device according to the prior art,

FIG. 2 shows a coding method according to the invention,

FIG. 3 shows pixels of an image situated on either side of a block edge,

Figure 5:
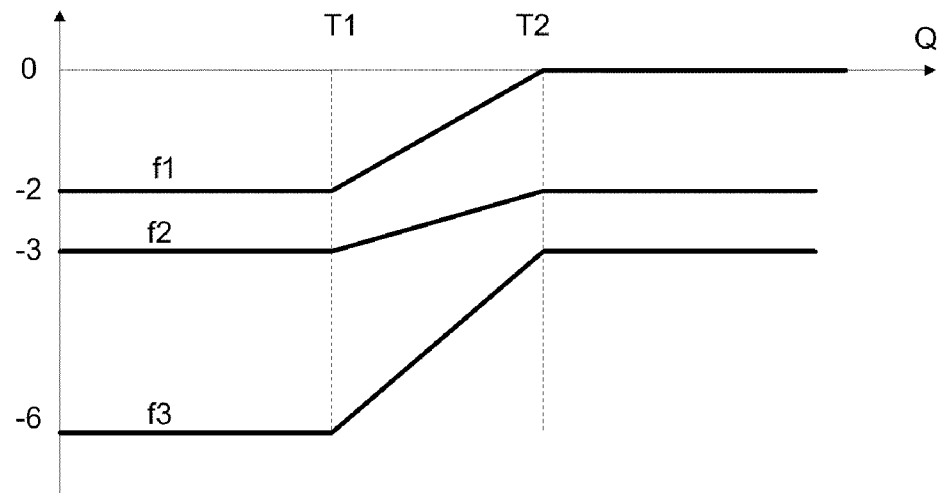
Figure 6:
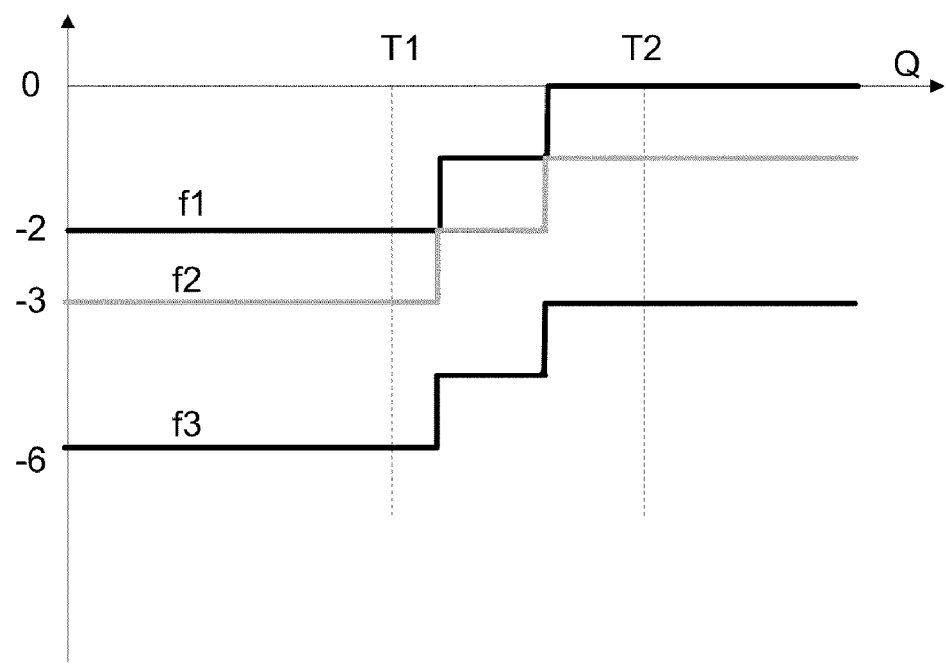
Figure 7:
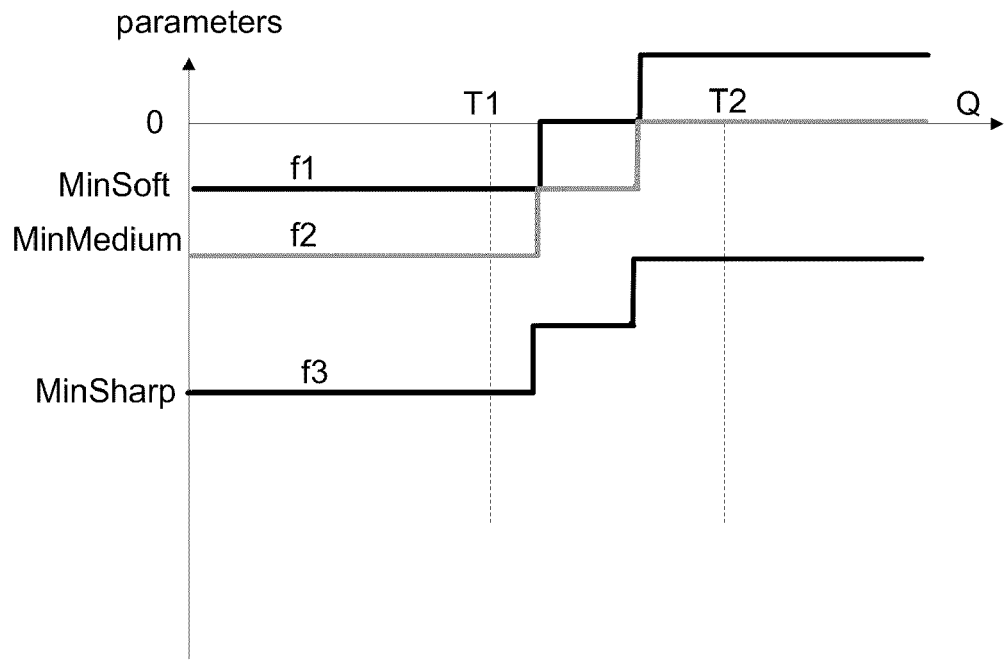
Figure 8:
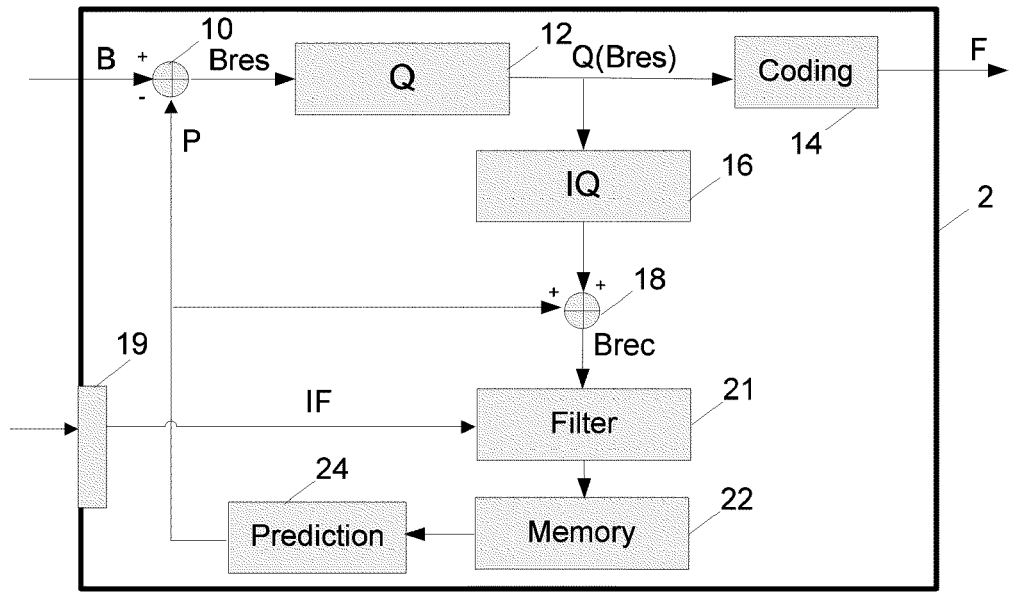

FIG. 4 shows a filtering method according to the prior art (H.264/MPEG4 AVC standard), FIG. 5 shows, according to a first embodiment, a set of three curves representing the variations of the slice_alpha_c0_offset_div2 and slice_beta_offset_div2 parameters defined in the H.264/MPEG4 AVC standard according to a quantization step, FIG. 6 shows, according to a second embodiment, a set of three curves representing the variations of the slice_alpha_c0_offset_div2 and slice_beta_offset_div2 parameters defined in the H.264/MPEG4 AVC standard according to a quantization step for type I images, FIG. 7 shows, according to a second embodiment, a set of three curves representing the variations of the slice_alpha_c0_offset_div2 and slice_beta_offset_div2 parameters defined in the H.264/MPEG4 AVC standard according to a quantization step for type P and B images, and FIG. 8 shows a coding device according to the invention.

5. DETAILED DESCRIPTION OF THE INVENTION

The method for coding an image sequence according to the invention is of coding methods type comprising a step of filtering that depends on at least two filtering parameters. This coding method is shown in FIG. 2. It applies to images of a sequence of several images preferentially divided into blocks of pixels. With each pixel is associated at least one item of image data such as an item of luminance or chrominance data. The coding method is described in reference to FIG. 2 for a block B.

During a step 25 and prior to the coding of blocks of the sequence, a function representing the variations of two filtering parameters according to a quantization step value in a set of at least two functions is selected from an IF value of filtering intensity. The IF value of filtering intensity is for example introduced by an operator according to a desired visual effect. Generally, a filtering step causes a smoothing of reconstructed image data. However, some operators prefer to conserve a certain sharpness of reconstructed images and thus privilege a low value of filtering intensity. The IF value of filtering intensity can be represented in digital form. For example, a value '1' can indicate a low filtering intensity, a value '2' a medium filtering intensity and a value '3' a high filtering intensity. The IF value of filtering intensity can also be defined in word form, each word defining a filtering intensity level. For example, a value 'low' can indicate a low filtering intensity, a value 'medium' a medium filtering intensity and a value 'high' a high filtering intensity. More generally, the filtering intensity values are defined such that they enable several filtering intensity levels to be distinguished.

During a step 26, a prediction block P is determined for the block B from one or more reference image data blocks {Bref}. These reference image data blocks generally correspond to image data blocks previously coded, reconstructed and filtered.

During a step 28, a residual image data block or residual block Bres is calculated from the block B and the prediction block P. More specifically, the block Bres is obtained by subtracting pixel by pixel the prediction block P from the block B.

During a step 30, the residual block Bres is quantized with a predetermined quantization step Q into a quantized data block Q(Bres). The quantization step is for example fixed for the entire sequence. It can be selected by an operator. It can also vary from image to image or even from block to block. It is generally determined by a bitrate regulation method. There are bitrate regulation methods well known to those skilled in the art. For example, the method described in the International patent application published Nov. 20, 1997 under the number WO 97/43859 can be used. Likewise for the regulation method known under the term TM5 regulation.

During a step 32, the block B is reconstructed from the block Q(Bres) into a reconstructed image data block Brec. For this purpose, an inverse quantization is applied to the quantized data block Q(Bres). The prediction block P is then added pixel by pixel to the data block after inverse quantization. This step generates a reconstructed image data block Brec.

During a step 34, the reconstructed image data block Brec is filtered according to at least two filtering parameters with a view to use of this reconstructed block and filtered as a reference image data block. During the filtering step 34 the value of at least two filtering parameters is determined from the function selected and the quantization step used in step 30.

During a step 36, the quantized data block Q(Bres) is coded by entropy coding in a coded data stream F. Such an entropy coding step is well known to those skilled in the art and is not further described. For example, it is possible to use VLC (Variable Length Coding) tables that associate with each item of data to be coded a binary word according to the appearance probability of the said item of data. During this step 36, the two filtering parameters are possibly coded in the stream F.

If the block B is the last block of the sequence of images to be coded then the coding method is completed, otherwise the method repeats step 26 with a new image data block B.

According to a variant, the method comprises a step 29 of transformation of the residual image data block Bres for example using a Discrete Cosine Transform. According to this variant, the quantization step 30 applies to the residual block Bres after transformation. According to this variant, the reconstruction step 32 comprises an inverse transformation to that applied in step 29 after the inverse quantization step and before the addition of the prediction block P.

According to a particular embodiment, the coding method complies with the H.264/MPEG4 AVC standard. This standard is notably defined in the ISO/IEC 14496-10 document entitled "Information technology—Coding of audio-visual objects—Part 10: Advanced Video Coding" published on 15 Aug. 2006. This document defines in part in section 8.7 the manner in which the filtering step 34 is applied. This filtering step presents several advantages. Notably it enables the quality of reconstructed images to be improved by smoothing the edges of the blocks. It also enables the coding efficiency to be improved as the use of filtered blocks to determine the prediction blocks enables reduction of the quantity of residual image data to be coded. It operates on the vertical and horizontal edges of 4×4 sized image data blocks. For each macroblock (block of size 16×16), the filtering step is applied initially, from left to right, on the vertical edges of blocks. More specifically, the filter applies to 16 vertical edges of 4×4 sized blocks for the luminance and on 8 vertical edges of 4×4 sized blocks for the chrominance. The same operation is then carried out on the horizontal edges.

The filtering step as defined in the document ISO/IEC 14496-10 is described in reference to FIGS. 3 and 4 for a vertical edge. The pixels, pi and qi (i=0 . . . 3) are the pixels on either side of the edge before filtering. The pixels, pi' and qi' (i=0 . . . 3) are the pixels on either side of the edge after filtering. The filtering step notably depends on a value Bs that characterizes the filtering strength and that is calculated in step 40 of FIG. 4. The value of Bs is determined from the following table:

| Conditions | Bs |
| --- | --- |
| p and q are INTRA blocks and the edge is a macroblock edge | Bs = 4 (filtering is high) |
| p and q are INTRA blocks and the edge is not a macroblock edge | Bs = 3 |
| Neither p or q is an INTRA block, p and q contain coded coefficients | Bs = 2 |
| Neither p or q is an INTRA block, Neither p or q contain coded coefficients, p and q have different reference images or a different number of reference images or different motion vectors | Bs = 1 |
| Neither p or q is an INTRA block, Neither p or q contain coded coefficients, p and q have the same reference image and identical motion vectors | Bs = 0 (no filtering) |

The filtering step is then adapted according to the value of Bs. However, the decision to filter an edge or not does not only depend on the value of Bs. In fact, even in the case where Bs is other than zero, the filtering step may not be necessary. This is notably the case when there is a marked transition on the edge of a block. In this case it is preferable not to filter this transition. Hence the pixels p2, p1, p0 and q0, q1, q2 are filtered only if the following two conditions are fulfilled:

$$Bs > 0$$

$$|p0-q0|<\alpha \text{ and } |p1-p0|<\beta \text{ and } |q1-q0|\leq \beta$$

where α and β are thresholds defined in paragraph 8.7.2.2 in the document ISO/IEC 14496-10 entitled 'Information technology—Coding of audio-visual objects—Part 10: Advanced Video Coding" published on 15 Aug. 2006.

The values α and β increase according to the quantization step of the blocks P and Q. When QP is small, a small transition is probably due to characteristics of the image which should be preserved rather than the effects of blocks. In this case, the values α and β are low. When QP is large, the effects of blocks are probably more significant. In this case, the values α and β are higher and furthermore the pixels are filtered.

The values α and β are calculated in step 42 of FIG. 4 from IndexA and IndexB in accordance with tables 8-16 of the document ISO/IEC 14496-10.

The parameters of IndexA and IndexB are defined as follows:

$$\text{Index}A=(QP(P)+QP(Q))/2+\text{FilterOffset}A \text{ and}$$

$$\text{Index}B=(QP(P)+QP(Q))/2+\text{FilterOffset}B$$

where:

QP(P) is the quantization step of the block P and QP(Q) is the quantization step of the block Q, FilterOffsetA and FilterOffsetB are calculated in accordance with the equations (7-29) and (7-30) defined in paragraph 7.4.3 of the document ISO/IEC 14496-10 from the two filtering parameters slice_alpha_c0_offset_div2 and slice_beta_offset_div2:

FilterOffsetA=2*slice_alpha_c0_offset_div2 and FilterOffsetB=2*slice_beta_offset_div2.

The filtering parameters slice_alpha_c0_offset_div2 and slice_beta_offset_div2 are coded in the stream F in the headers relating to slices of blocks.

The filtering of pixels carried out in step 44 of FIG. 4 is applied in the following manner if $1 \leq Bs \leq 3$ (in accordance with paragraph 8.7.2.3 of the document ISO/IEC 14496-10):

a filter of length 4 is applied on the pixels p1, p0, q0, q1 in order to generate the filtered pixels p'0 and q'0 by applying the equations (8-470) and (8-472).

If $|p2-p0| \leq \beta$, a first filter of length 4 is applied on the pixels p2, p1, p0, q0, in order to generate a filtered pixel p'1 for the luminance only by applying the equations (8-479).

If $|q2-q0| \leq \beta$, a second filter of length 4 is applied on the pixels q2, q1, q0, p0, in order to generate a filtered pixel q'1 for the luminance only by applying the equations (8-480).

In the other cases, the pixels are not modified.

The filtering of pixels applies in the following manner according to whether Bs=4 (in accordance with paragraph 8.7.2.4 of the document ISO/IEC 14496-10 and to the equations (8-485) to (8-498)):

If $|p2-p0| \leq \beta$ and $|p0-q0| \leq \alpha/4$ and the block to be filtered is a block of luminance image data then p'0 is generated by a filter of length 5 using the pixels p2, p1, p0, q0, q1, p'1 is generated by a filter of length 4 using the pixels p2, p1, p0, q0, and p'2 is generated by a filter of length 5 using the pixels p3, p2, p1, p0, q0, otherwise p'0 is generated by a filter of length 3 using the pixels p1, p0 and q0 by applying the equations (8-479).

If $|q2-q0| \leq \beta$ and $|p0-q0| \leq \alpha/4$ and the block to be filtered is a block of luminance image data then q'0 is generated by a filter of length 5 using the pixels q2, q1, q0, p0, p1, q'1 is generated by a filter of length 4 using the pixels q2, q1, q0, p0 and q'2 is generated by a filter of length 5 using the pixels q3, q2, q1, q0, p0.

Otherwise q'0 is generated by a filter of length 3 using the pixels q1, q0, p1, the other pixels not being modified.

The invention enables the filtering step to be further modulated by enabling from a filtering intensity determined according to a desired visual effect, modification of the value of the parameters α and β. In fact, according to the invention the values α and β no longer depend only on the values of QP(P) and QP(Q) of the blocks located on either side of the edge to be filtered. Thus, for a same image sequence and the same quantization step values, the filtering step is applied more or less heavily according to the value of the filtering intensity IF. The invention thus enables a same impression of sharpness over the whole quantizing range to be maintained. Moreover, the reduction of filtering translating by an increase in the block effects, the invention advantageously enables a user to select the best compromise between clarity and block effect due to the introduction of a set of at least two functions such as those described below and their selection from a value of filtering intensity IF. According to the invention, the two filtering parameters slice_alpha_c0_offset_div2 and slice_beta_offset_div2 and thus FilterOffsetA and FilterOffsetB are determined according to steps 25 and 34 of the coding method.

According to a first embodiment, the set of at least two functions that represent the variations of the two filtering parameters, slice_alpha_c0_offset_div2 and slice_beta_offset_div2, according to a quantization step value comprise the three functions shown in FIG. 5. The three functions are defined as follows:

$$f1(QP)=-2 \text{ if } QP<T1 \text{ and } f1(QP)=2/(T2-T1)*(QP-T2) \text{ if } T1<QP<T2 \text{ and } f1(QP)=0 \text{ if } QP>T2;$$

$$f2(QP)=-3 \text{ if } QP<T1 \text{ and } f2(QP)=1/(T2-T1)*(QP+2*T1-3*T2) \text{ if } T1<QP<T2 \text{ and } f2(QP)=-2 \text{ if } QP>T2;$$

$$f3(QP)=-6 \text{ if } QP<T1 \text{ and } f3(QP)=3/(T2-T1)*(QP+T1-2*T2) \text{ if } T1<QP<T2 \text{ and } f3(QP)=-3 \text{ if } QP>T2;$$

where QP is the quantization step of the image slice to which belongs the block B.

According to a particular embodiment T1=12 and T2=36.

Each of the three functions correspond to a value of filtering intensity IF.

For example, if the filtering intensity is 'low' then the first function is selected, if the filtering intensity is 'medium' than the second function is selected and if the filtering intensity is 'high' then the third function is selected. The filtering intensity is for example an item of data fixed by an operator according to a desired visual effect. When the curve f3 is selected, the filtering parameters will necessarily be lower than those of the two other curves which reduces the filtering intensity and thus enables little details in the image to be conserved. This curve is preferentially applied in the case of high resolution content in which small block effects are less apparent. Generally, the filtering step causes a smoothing of reconstructed image data. However, some will prefer to conserve a certain sharpness of reconstructed images and thus privilege a low filtering intensity. Thus according to the visual effect desired by the operator, i.e. the filtering intensity, one of the three curves will be selected in step 25.

According to a variant, shown in FIGS. 6 and 7, two sets of three curves are defined, one being used for I type images (FIG. 6) and the other for P and B type images (FIG. 7). In the AVC standard, the possible values of slice_alpha_c0_offset_div2 and slice_beta_offset_div2 are integer values from −6 to +6. This is why the functions are rendered discrete as shown in FIGS. 6 and 7.

An I type image is an image for which all the blocks are coded in INTRA mode, a P type image is an image for which the blocks are coded either in INTRA mode or in INTER mode by reference to a block of another image, a B type image is an image for which the blocks are coded either in INTRA mode or in INTER mode by reference to one or more blocks of another image or to several other images. The 3 functions defined in FIG. 7 are the functions of FIG. 6 translated according to the ordinate axis of a positive value that depends on the quantity of estimated motion in the image sequence. For example, the values MinSoft, MinMedium and MinSharp of FIG. 7 are defined from the coordinates (MV_x_avg, MV_y_avg) of a medium motion vector calculated for the current image from motion vectors associated with each pixel of the current image. These motion vectors are for example produced using a pel-recursive type estimator from a current image and the image temporally preceding the current image.

By using the medium motion vector of the image calculated from the average of the pixel motion vectors with respect to the preceding image in the temporal order, a change rule for the values Minsoft, MinMedium and MinSharp is defined in the following manner:

If |MV_x_avg|<thresh_x_low_motion and |MV_y_avg|<thresh_y_low_motion, then, MinSharp=−6, MinMedium=−3, MinSoft=−2

If thresh_x_low_motion<|MV_x_avg|<thresh_x_high_motion and thresh_y_low_motion<|MV_y_avg|<thresh_y_high_motion then, MinSharp=−5, MinMedium=−2, MinSoft=−1

If |MV_x_avg|>thresh_x_high_motion or |MV_y_avg|>thresh_y_high_motion then, MinSharp=−4, MinMedium=−1, MinSoft=0 where thresh_x_low_motion, thresh_x_high_motion, thresh_y_low_motion and thresh_y_high_motion are thresholds defined such that thresh_x_low_motion<thresh_x_high_motion and thresh_y_low_motion<thresh_y_high_motion. For example:

thresh_x_low_motion=16
thresh_x_high_motion=128
thresh_y_low_motion=9
thresh_y_high_motion=72

The invention also relates to a coding device 2 described in reference to FIG. 8 that compresses and codes image data in the form of a data stream with a view for example to their transfer via a network. In this figure, the modules shown are functional units that may or may not correspond to physically distinguishable units. For example, these modules or some of them can be grouped together in a single component, or constitute functions of the same software. On the contrary, some modules may be composed of separate physical entities. Such a coding device 2 operates generally on blocks of pixels B. With each pixel is associated at least one item of image data. The coding device 2 notably implements a coding with temporal (mode INTER) and possibly spatial (mode INTRA) prediction. The coding device 2 notably comprises a calculation module 10 subtracting pixel by pixel from a current block B, a prediction block P to generate a block of residual image data or residual block noted as Bres. It comprises in addition a quantization module 12 quantizing the residual block Bres into quantized data Q(Bres). According to a variant the quantization module 12 applies a transform on the residual image data such as for example a Discrete Cosine Transform. The coding module 2 further comprises an entropy coding module 14 coding the quantized data into a stream F of coded data. It also comprises a module 16 carrying out the inverse operation of module 12. The module 16 carries out an inverse quantization IQ possibly followed by an inverse transform IT. The module 16 is connected to a calculation module 18 that adds pixel by pixel the block of data from the module 16 and the prediction block P to generate a block of reconstructed image data. It also comprises a module 19 for introduction of a value representative of a filtering intensity. It comprises moreover a filtering module 21 that filters reconstructed image data prior to their storage in a memory 22. The filter 21 receives the filtering intensity value IF introduced by means of an introduction module 19. The introduction means are for example a keyboard or a menu displayed on a screen with icons that can be selected for example by means of a mouse or a vocal recognition module. The filter 21 is also adapted to select a function representing the variations of at least two filtering parameters according to a quantization step value in a set of at least two functions from the filtering intensity value IF introduced by means of the introduction module 19 in accordance with step 25.

The filter 21 is adapted to determine, in accordance with step 34, the value of the at least two filtering parameters from said function selected and the quantization step.

The prediction block P is determined from reference image data stored in the memory 22. The reference image data belong either to the same image as the block B (mode INTRA) or to other images (mode INTER). The prediction module 24 is not described. However, it is well known to those skilled in the art of video coders that such a prediction module 24 comprises motion compensation and motion estimation units as well as possibly a spatial prediction unit. The coding device 1 comprises other modules such as a decision module that selects a coding mode for the block B in a coding mode predefined set.

Naturally, the invention is not limited to the embodiment examples mentioned above. In particular, those skilled in the art may apply any variant to the stated embodiments and combine them to benefit from their various advantages. More specifically, the invention can be applied to standards other than the H.264/MPEG4 AVC standard on condition that it defines a filtering step for which the strength can be regulated for the image sequence or for each image via one or more filtering parameters transmitted in the syntax.

What is claimed is:

1. A method for coding a sequence of images into an H.264 coded data stream, each image being divided into blocks of pixels with each of which is associated at least one item of image data comprising the steps of:
    determining, for the image data, the prediction image data from reference image data,
    calculating residual data from said image data and said prediction image data,
    quantizing said residual data with a quantization step,
    reconstructing said image data into reconstructed image data,
    filtering said reconstructed image data according to two filtering parameters slice_alpha_c0_div2 and slice_beta_offset_div2 with a view to their use as reference image data, and
    coding said quantized residual data into said H.264 coded data stream, said coding further comprising the steps of:
        selecting a function representing the variations of said slice_alpha_c0_div2 and slice_beta_offset_div2 filtering parameters according to a quantization step value in a set of at least two functions using a value representative of a filtering intensity determined according to a desired visual effect,
        determining the value of said slice_alpha_c0_div2 and slice_beta_offset_div2 filtering parameters from said function selected and said quantization step.

2. A method for coding according to claim 1, wherein the set of functions comprises a first function f1, a second function f2 and a third function f3 defined as follows:

$f1(QP)=-2$ if $QP<T1$ and $f1(QP)=2/(T2-T1)*(QP-T2)$ if $T1<QP<T2$ and $f1(QP)=0$ if $QP>T2$, $f2(QP)=-3$ if $QP<T1$ and $f2(QP)=1/(T2-T1)*(QP+2*T1-3*T2)$ if $T1<QP<T2$ and $f2(QP)=-2$ if $OP>T2$, $f3(QP)=-6$ if $QP<T1$ and $f3(QP)=3/(T2-T1)*(QP+T1-2*T2)$ if $T1<QP<T2$ and $f3(QP)=-3$ if $OP>T2$, where QP the quantization step.

3. A method for coding according to claim 2, wherein T1=12 and T2=36.

4. A method for coding according to claim 3, wherein if said filtering intensity is low then the first function is selected, if said filtering intensity is medium than the second function is selected and if said filtering intensity is high then the third function is selected.

5. A method for coding according to claim 1, wherein said function representing the variations of said slice_alpha_c0_div2 and slice_beta_offset_div2 filtering parameters according to a quantization step value is selected, for the INTRA type images in a first set of first functions and for INTER type images, in a second set of second functions, said second functions being said first functions translated from a positive value.

6. A method for coding according to claim 5, wherein said positive value depends on a motion quantity determined in the image sequence.

7. A device for coding a sequence of images into an H.264 coded data stream, each image being divided into blocks of pixels with each of which is associated at least one item of image data, the device comprising:
    means for determining, for the image data, the prediction image data from reference image data,
    means for calculating residual data from said image data and said prediction image data,
    means for quantizing said residual data with a quantization step,
    means for reconstructing said image data into reconstructed image data,
    means for filtering said reconstructed image data according to slice_alpha_c0_div2 and slice_beta_offset_div2 filtering parameters with a view to their use as reference image data,
    means for coding said quantized residual data into an H.264 coded data stream; said coding means further comprising:
        means for introducing a value representative of a filtering intensity according to a desired visual effect,
        means for selecting a function representing the variations of said at least one filtering parameter according to a quantization step value of a set of at least two functions from said filtering intensity value,
        means for determining the value of said slice_alpha_c0_div2 and slice_beta_offset_div2 filtering parameters from said function selected and said quantization step.

* * * * *